May 6, 1941.  W. A. DERR  2,240,639
TELEMETRIC SYSTEM
Filed June 23, 1939
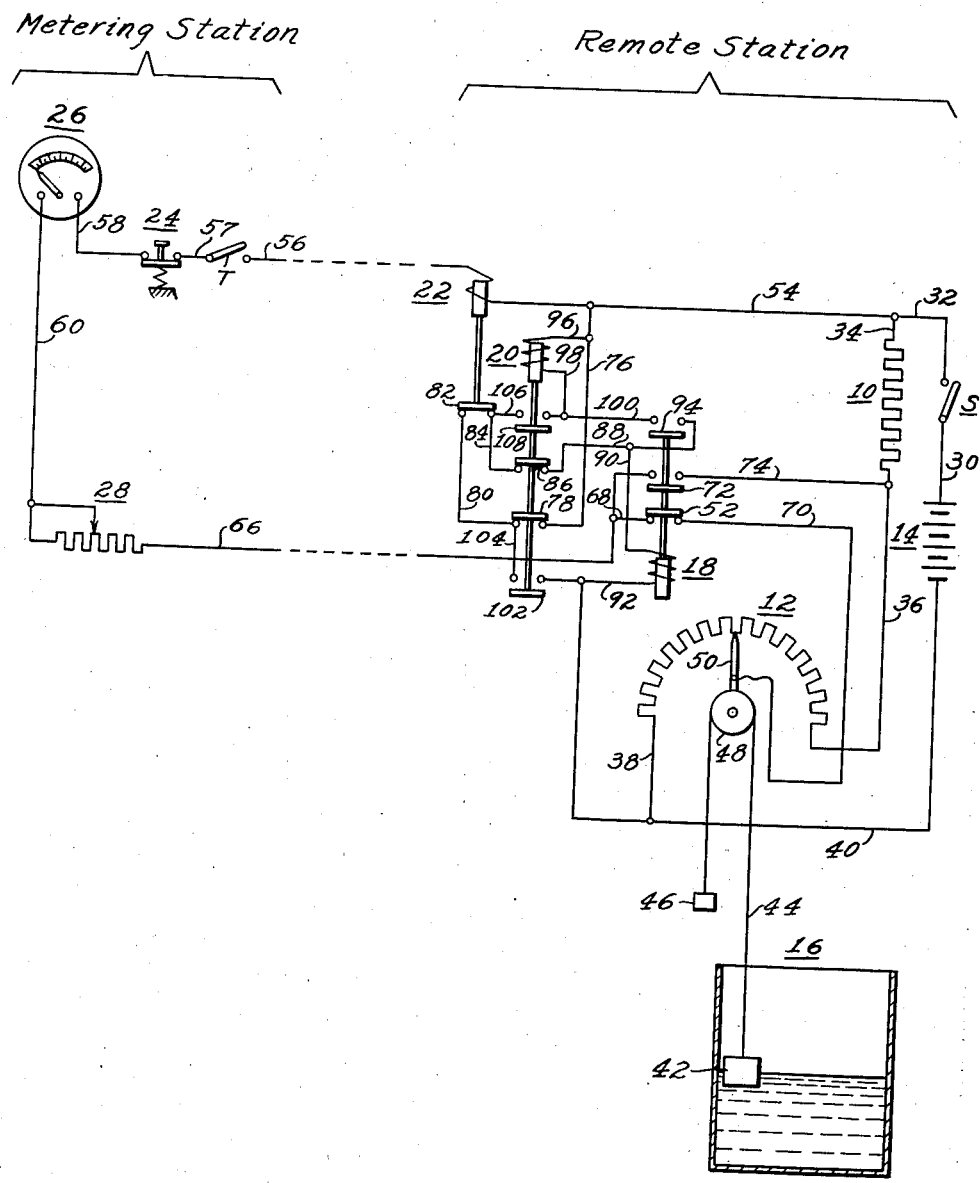

Patented May 6, 1941

2,240,639

UNITED STATES PATENT OFFICE 2,240,639

TELEMETRIC SYSTEM

Willard A. Derr, Wilkinsburg, Pa., assignor to Westinghouse Electric & Manufacturing Company, East Pittsburgh, Pa., a corporation of Pennsylvania Application June 23, 1939, Serial No. 280,693

10 Claims. (Cl. 177—351)

My invention relates, generally, to telemetric systems and, more particularly, to a calibrating system for potentiometer type telemetric systems.

It is common practice to indicate at a metering station a condition or quantity at a remote station by impressing the potential of the station battery, or any other suitable source of power at the remote station, upon a potentiometer, and producing an indication of the condition or quantity at the metering station by means of a suitable meter connected to the part of the remote potentiometer selected by the condition or quantity at the remote station. Such potentiometer type telemetric systems have the disadvantage that variations in the potential of the remote station power supply cause inaccuracies in the indication at the metering station and require that the system be calibrated to compensate for these potential variations. The potentiometer type telemetric system is the least expensive type of system but it has not been used to a great extent because of the lack of an adequate calibrating means to compensate for variations in the potential of the power supply at the remote station.

An object of my invention, therefore, is to provide potentiometer type telemetric systems with a calibrating system which shall function to simply and efficiently permit compensation for variations in the potential applied to the potentiometer at the remote station, and which shall be simple in construction and operation, and inexpensive to manufacture, install, and repair.

These and other objects and advantages of the invention will be apparent from the following detailed description taken in connection with the accompanying drawing which is a diagrammatic view of a telemetric system embodying the principal features of my invention.

In practicing my invention, I provide a transmitting potentiometer at the remote station comprising a fixed resistor 10 and a variable resistor 12 connected to be energized by the battery 14 or any other suitable source of potential at the remote station. The variable resistor 12 may be operated in accordance with any variable quantity or condition which it is desired to indicate at the metering station such, for example, as liquid level as measured by the liquid level measuring apparatus 16, gate position, valve position, and the like. Relays 18, 20 and 22 are so connected as to be selectively operated by a control switch 24 at the metering station to selectively connect either the fixed resistor 10 alone or the fixed resistor 10 and the part of the variable resistor 12 selected by the measuring apparatus 16 to the line connecting the remote station with an electrically responsive device such as a meter 26 at the metering station. When the resistor 10 alone is connected to the meter 26, the rheostat 28 may be manipulated to calibrate the meter 26 for a predetermined reading such as zero indication for the potential acting on the potentiometer at the remote station. After being thus calibrated the meter is connected to be energized by the potential across both the resistor 10 and the selected part of the variable resistor 12 to give a true indication of the measured quantity or condition at the remote station.

Considering the system more in detail, the potentiometer at the remote station comprising the resistor 10 and the variable resistor 12 may be connected to the station battery 14, or any other suitable source of electrical power, by means of the switch S through a circuit which extends from one side of the battery 14 through the conductor 30, switch S, conductors 32 and 34, the resistor 10, conductor 36, the rheostat 12, and conductors 38 and 40 to the other side of the battery 14.

The liquid level measuring device 16 may comprise a float 42 connected by means of a cord 44 and balancing weight 46 to a pulley 48 which actuates the movable contact arm 50 of the variable resistor 12.

The portion of the potentiomter selected by the liquid level measuring device 16 may be connected in circuit with the meter 26 at the metering station by the back contact element 52 of the relay 18 in a circuit which extends from one terminal of the resistor 10 through the conductors 34 and 54, the winding of relay 22, conductor 56, switch T, conductor 57, control switch 24, conductor 58, the meter 26, conductor 60, calibrating rheostat 28, conductors 66 and 68, contact element 52, conductor 70, and the contact arm 50 to the selected part of the variable resistor 12.

The resistor 10 has a predetermined fixed resistance value and may be connected in circuit with the meter 26 to permit calibration of the meter by means of the contact element 72 of the relay 18. This calibrating circuit extends from one terminal of the resistor 10 through conductors 34 and 54, the winding of relay 22, conductor 56, switch T, conductor 57, control switch 24, conductor 58, meter 26, conductor 60, the calibrating rheostat 28, conductor 66, contact element 72, and conductors 74 and 36 to the other terminal of the resistor 10. With relays 20 and 22 in their deenergized position, an energizing circuit is established for the relay 18 which extends from one terminal of the battery 14, through conductor 30, switch S, conductors 32, 54 and 76, contact element 78 of the relay 20, conductor 80, contact element 82 of the relay 22, conductor 84, contact element 86 of the relay 20, conductors 88 and 90, the winding of relay 18, and conductors 92 and 40 to the other terminal of the battery 14.

The contact element 94 of the relay 18 establishes a circuit connecting the winding of the relay 20 in series circuit relation with the winding of the relay 18 when the relay 18 is energized. This series circuit extends from one terminal of the battery 14 through the conductors 32, 54, 76, and 96, the winding of relay 20, conductors 98 and 100, the contact element 94, conductors 88 and 90, the winding of relay 18, and conductors 92 and 40 to the other terminal of the battery 14. With relay 22 in the deenergized position, however, there is a shunting circuit for the winding of the relay 20 which extends from one side of the winding of relay 20 through the conductors 96 and 76, contact element 78, conductor 80, contact element 82, conductor 84, contact element 86, conductor 88, contact element 94, and conductors 100 and 98 to the other side of the winding of the relay 20.

With the relay 20 energized and the relay 22 deenergized, a shunting circuit is established for the winding of the relay 18 which extends from one side of the winding of the relay 18 through the conductor 92, a contact element 102 of the relay 20, conductors 104 and 80, contact element 82 of the relay 22, conductor 106, a contact element 108 of the relay 20, conductor 100, contact element 94, and conductors 88 and 90 to the other side of the winding of the relay 18.

When it is desired to place the system in operation, the switch S is moved to the closed circuit position, energizing the transmitting potentiometer which comprises the fixed resistor 10 and the variable resistor 12 and energizing the relay 18. The switch T at the metering station may next be actuated to the closed circuit position, thus energizing the relay 22. Relay 22 operates and opens its contact element 82 which removes the shunting circuit from the winding of the relay 20 and energizes relay 20 in series circuit with relay 18. With the relay 18 thus energized, its contact element 72 is closed to establish a circuit between the metering station and the resistor 10 as hereinbefore described and the calibrating resistor 28 at the metering station may be actuated to establish a predetermined deflection, such as the zero point on the meter 26, the meter 26 being so constructed as to require a predetermined energization to establish a zero reading.

After the calibration of the meter 26 by the calibrating rheostat 28, the control switch 24 at the metering station may be opened and closed to set up the apparatus at the remote station for the metering indication. The actuation of the switch 24 to the open circuit position will deenergize the relay 22 to close the hereinbefore described shunting circuit for the winding of the relay 18, causing the relay 18 to move to the deenergized position. The relay 20 will remain energized, however, while the relay 22 is deenergized, through a circuit which extends from one terminal of the battery 14 to the conductor 30, switch S, conductors 32, 54, 76, and 96, the winding of relay 20, conductors 98 and 100, contact element 108, conductor 106, contact element 82, conductors 80 and 104, contact element 102, and conductors 92 and 40 to the other terminal of the battery 14. When the control switch 24 is moved to the closed circuit position, the relay 22 will again be energized, causing the contact element 82 to open the circuit of the relay 20 and cause the relay 20 to return to the deenergized position. The metering circuit will then be established by means of the contact element 52 of the relay 18 which completes the circuit from the part of the transmitting potentiometer selected by the liquid level measuring device 16 to the meter 26, and the meter will give the indication of the liquid level at the remote station.

When it is again desired to calibrate the meter 26 to compensate for any variation of the voltage of the battery 14 at the remote station, the control switch 24 is again moved to open circuit position and permitted to return to closed circuit position. The opening of control switch 24 will deenergize the relay 22 to move its contact element 82 to closed circuit position to establish the hereinbefore described energizing circuit for the relay 18. The relay 18 will then move to energized position and when the control switch 24 is again closed, the relay 22 will be energized to remove the shunting circuit from the relay 20 and permit it to be energized in series circuit with the relay 18. The resistor 10 will then be connected by means of the contact element 72 of the relay 18 in circuit with the meter 26 at the metering station, and the meter may be calibrated as hereinbefore described by actuation of the calibrating rheostat 28. Thus one opening-and-closing operation of the control switch 24 will cause the resistor 10 of the potentiometer at the remote station to be connected in circuit with the meter at the metering station and a succeeding opening-and-closing operation of the control switch 24 will cause the selected part of the transmitting potentiometer at the remote station to be connected in circuit with the meter 26 at the metering station.

It is to be understood that the control device for the variable resistor 12 may be any other device which varies with the variable quantity or condition at the remote station which is to be indicated at the metering station and that the liquid level device 16 is merely shown as an example of such control equipment.

Thus, it will be seen that I have provided a calibrating system for a potentiometer type telemetric system which shall function to simply and efficiently permit compensations for the variations in the potential applied to the potentiometer at the remote station, and which shall be simple in construction and operation, and inexpensive to manufacture, install, and repair.

In compliance with the requirements of the patent statutes, I have shown and described herein a preferred embodiment of my invention. It is to be understood, however, that the invention is not limited to the precise construction shown and described, but is capable of modification by one skilled in the art, the embodiment herein shown being merely illustrative of the principles of my invention.

I claim as my invention:

1. In a telemeteric system having a potentiometer connected to a source of electrical energy at a remote station and a meter at a metering station connected in a metering circuit with the remote station to be energized by the potentiometer potential applied to the circuit at the remote station, the combination of relay means at the remote station responsive to the opening and closing of the metering circuit to connect a predetermined portion of the potentiometer in circuit with the meter, and means for calibrating the meter while the said predetermined portion of the potentiometer is connected in the meter circuit, said relay means being responsive to a succeeding opening and closing of the metering circuit to connect the portion of the potentiometer selected in accordance with the quantity to be measured in the metering circuit.

2. In a telemetric system having a potentiometer connected to a source of electrical energy at a remote station and operable in accordance with the quantity to be measured at the remote station and a meter at a metering station connected in a metering circuit wiith the remote station to be energized by the potentiometer potential applied to the circuit at the remote station, in combination, relay means at the remote station including a relay, circuit means whereby the relay, when energized, connects a predetermined portion of the potentiometer to the metering circuit and, when deenergized, connects that portion of the potentiometer which is selected in accordance with the quantity to be measured to the metering circuit, said relay means also including circuit control means controlled from the metering station for alternately energizing and deenergizing said relay.

3. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the circuit at the remote station, in combination, relay means at the remote station including a relay, circuit means whereby the relay, when energized, connects a predetermined portion of the potentiometer to the metering circuit and, when deenergized, connects that portion of the potentiometer which is selected in accordance with the quantity to be measured to the metering circuit, said relay means also including means responsive to successive opening-and-closing operations on the metering circuit for successively energizing and deenergizing said relay, and means at the metering station for performing opening-and-closing operations on the metering circuit.

4. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the circuit at the remote station, in combination, relay means at the remote station including a relay, circuit means whereby the relay, when energized, connects a predetermined portion of the potentiometer to the metering circuit and, when deenergized, connects that portion of the potentiometer which is selected in accordance with the quantity to be measured to the metering circuit, said relay means also including circuit control means controlled from the metering station for alternately energizing and deenergizing said relay, and means at the metering station for calibrating the meter while the predetermined portion of the potentiometer is connected to the metering circuit.

5. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the circuit at the remote station, in combination, relay means at the remote station including a relay, circuit means whereby the relay, when energized, connects a predetermined portion of the potentiometer to the metering circuit and, when deenergized, connects that portion of the potentiometer which is selected in accordance with the quantity to be measured to the metering circuit, said relay means also including means responsive to successive open-and-closing operations on the metering circuit for successively energizing and deenergizing said relay, means at the metering station for performing open-and-closing operations on the metering circuit, and means at the metering station for calibrating the meter while the predetermined portion of the potentiometer is connected to the metering circuit.

6. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the metering circuit at the remote station, the combination of relay means at the remote station including a relay having energized and deenergized positions, circuit means whereby a predetermined portion of the potentiometer is connected to the metering circuit when said relay is in one of its positions, circuit means whereby the portion of the potentiometer selected in accordance with the quantity to be measured is connected to the metering circuit when said relay is in the other of its positions, said relay means also including means responsive to successive opening-and-closing operations on the metering circuit for successively energizing and deenergizing said relay, and means for performing opening-and-closing operations on the metering circuit.

7. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the metering circuit at the remote station, the combination of relay means at the remote station including a relay having energized and deenergized positions, circuit means whereby a predetermined portion of the potentiometer is connected to the metering circuit when said relay is in one of its positions, circuit means whereby the portion of the potentiometer selected in accordance with the quantity to be measured is connected to the metering circuit when said relay is in the other of its positions, said relay means also including circuit control means controlled from the metering station for alternately energizing and deenergizing said relay, and means for calibrating the meter while the said predetermined portion of the potentiometer is connected to the metering circuit.

8. In a telemetric system having a potentiometer connected to a source of electrical energy at a remote station and operable in accordance with the quantity to be measured at the remote station and a meter at a metering station connected in a metering circuit with the remote station to be energized by the potentiometer potential applied to the metering circuit at the mote station, the combination of relay means at the remote station including a relay having energized and deenergized positions, circuit means whereby a predetermined portion of the potentiometer is connected to the metering circuit when said relay is in one or its positions, circuit means whereby the portion of the potentiometer selected in accordance with the quantity to be measured is connected to the metering circuit when said relay is in the other of its positions, said relay means also including means responsive to successive opening-and-closing operations on the metering circuit for successively energizing and deenergizing said relay, means for performing opening-and-closing operations on the metering circuit, and means for calibrating the meter while the said predetermined portion of the potentiometer is connected to the metering circuit.

9. In a telemetric system having a meter at a metering station connected in circuit with a remote station at which a potentiometer is connected to a source of electrical energy to apply a potential to the metering circuit, relay means at the remote station sequentially operable to connect either a predetermined portion of the potentiometer or the portion of the potentiometer selected in accordance with the quantity to be measured to the metering circuit, and means at the metering station for operating said relay means in sequence.

10. In a telemetric system, in combination, a meter, a potentiometer at a remote station, a source of electrical energy at the remote station, means connecting the potentiometer across the source of electrical energy, means selectively actuating said potentiometer in accordance with the quantity being measured at the remote station, a metering circuit connecting said meter with the remote station, relay means at the remote station including a relay having energized and deenergized positions, circuit means whereby a predetermined portion of the potentiometer is connected to the metering circuit when said relay is in one of its positions, circuit means whereby the portion of the potentiometer selected in accordance with the quantity to be measured is connected to the metering circuit when said selective relay is in the other of its positions, said relay means also including means responsive to the opening and closing of the metering circuit for energizing said relay, and means responsive to a succeeding opening and closing of the metering circuit for deenergizing said relay.

WILLARD A. DERR.